No. 844,536. PATENTED FEB. 19, 1907.
H. U. PRINDLE.
EXTENSIBLE RULE AND CALIPERS.
APPLICATION FILED MAR. 27, 1905.
3 SHEETS—SHEET 1.
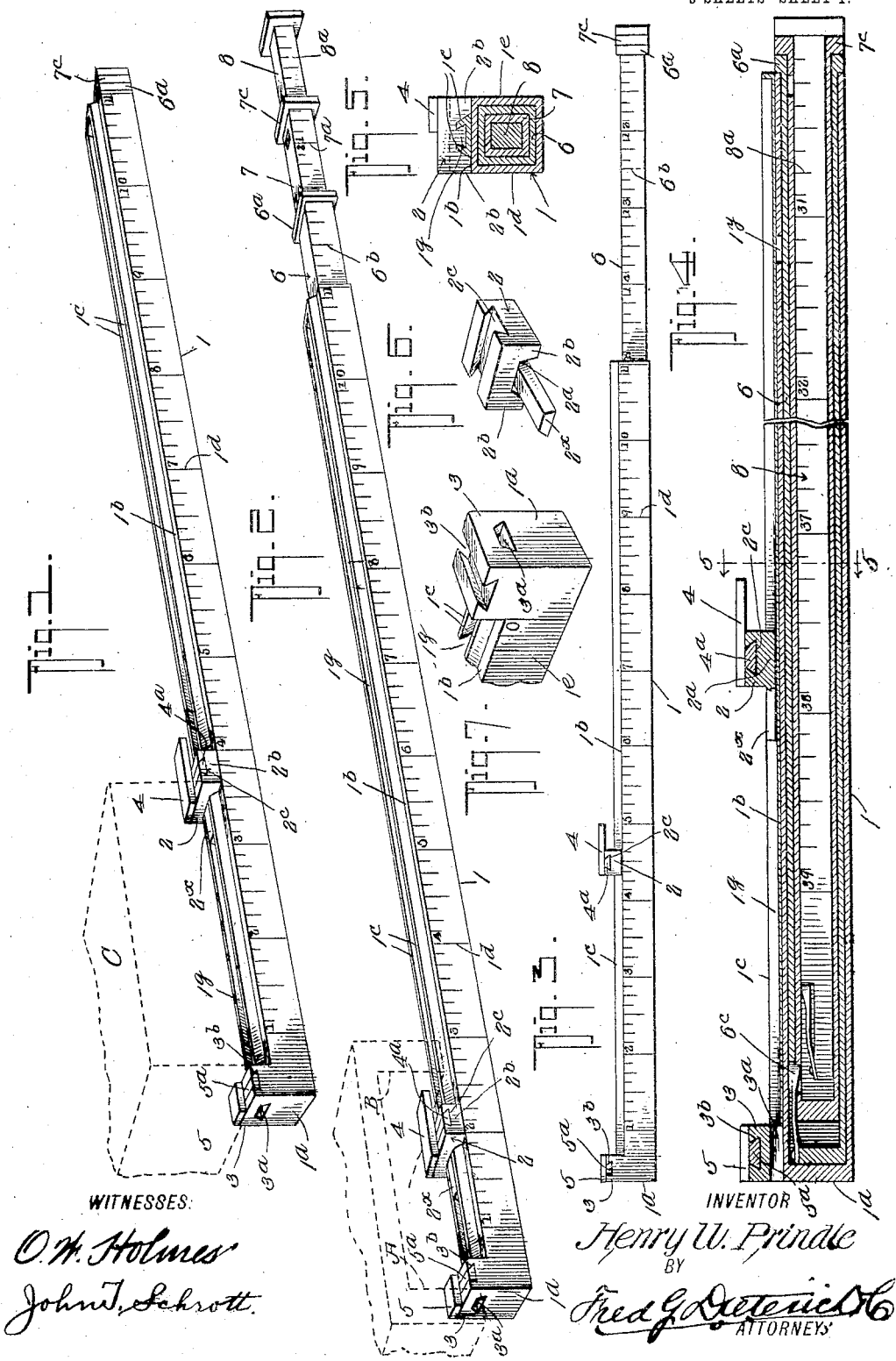
WITNESSES:
O. W. Holmes
John T. Schrott.
INVENTOR
Henry U. Prindle
BY
Fred G. Dieterich
ATTORNEYS

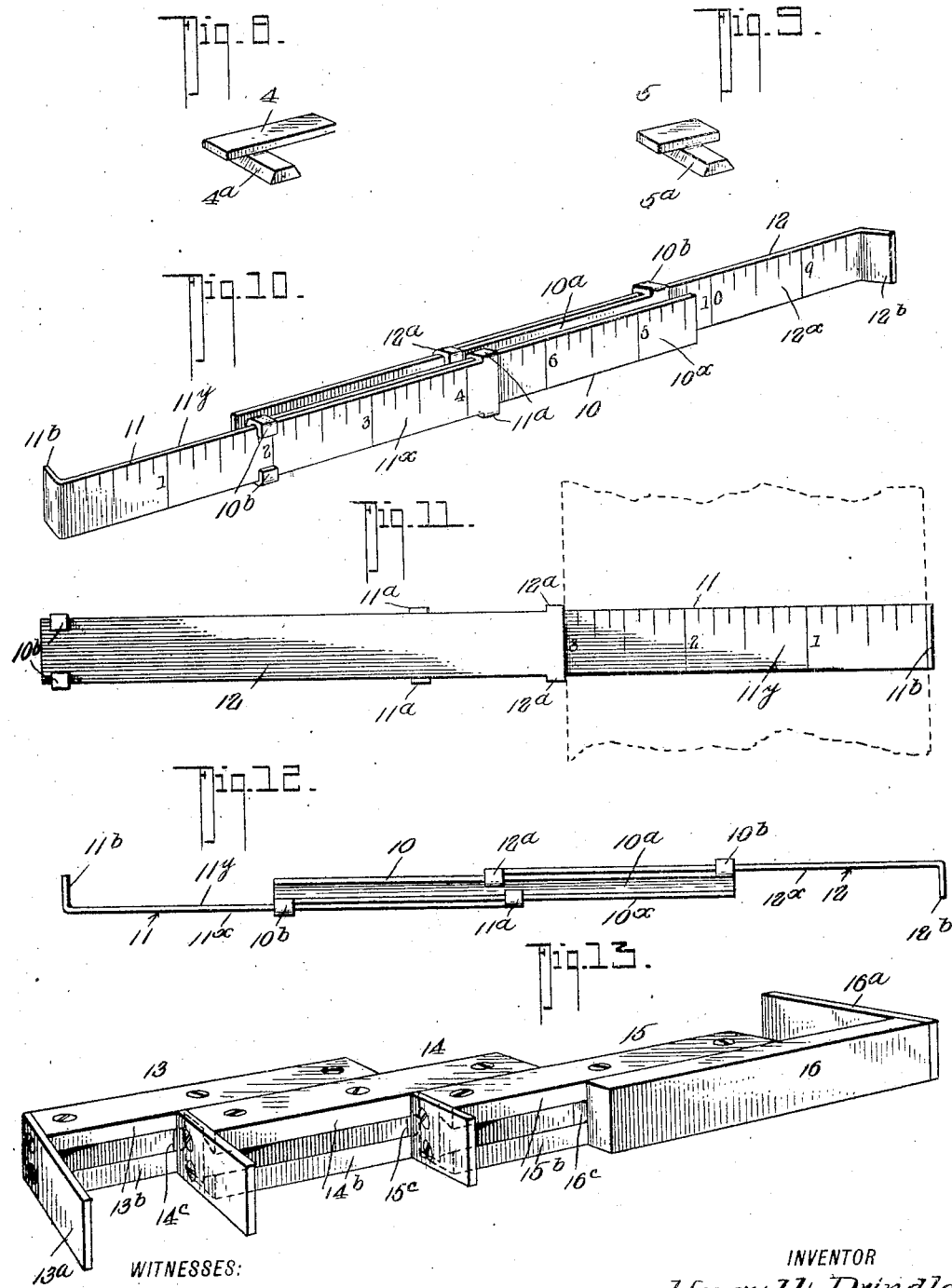

No. 844,536. PATENTED FEB. 19, 1907.
H. U. PRINDLE.
EXTENSIBLE RULE AND CALIPERS.
APPLICATION FILED MAR. 27, 1905.
3 SHEETS—SHEET 3.
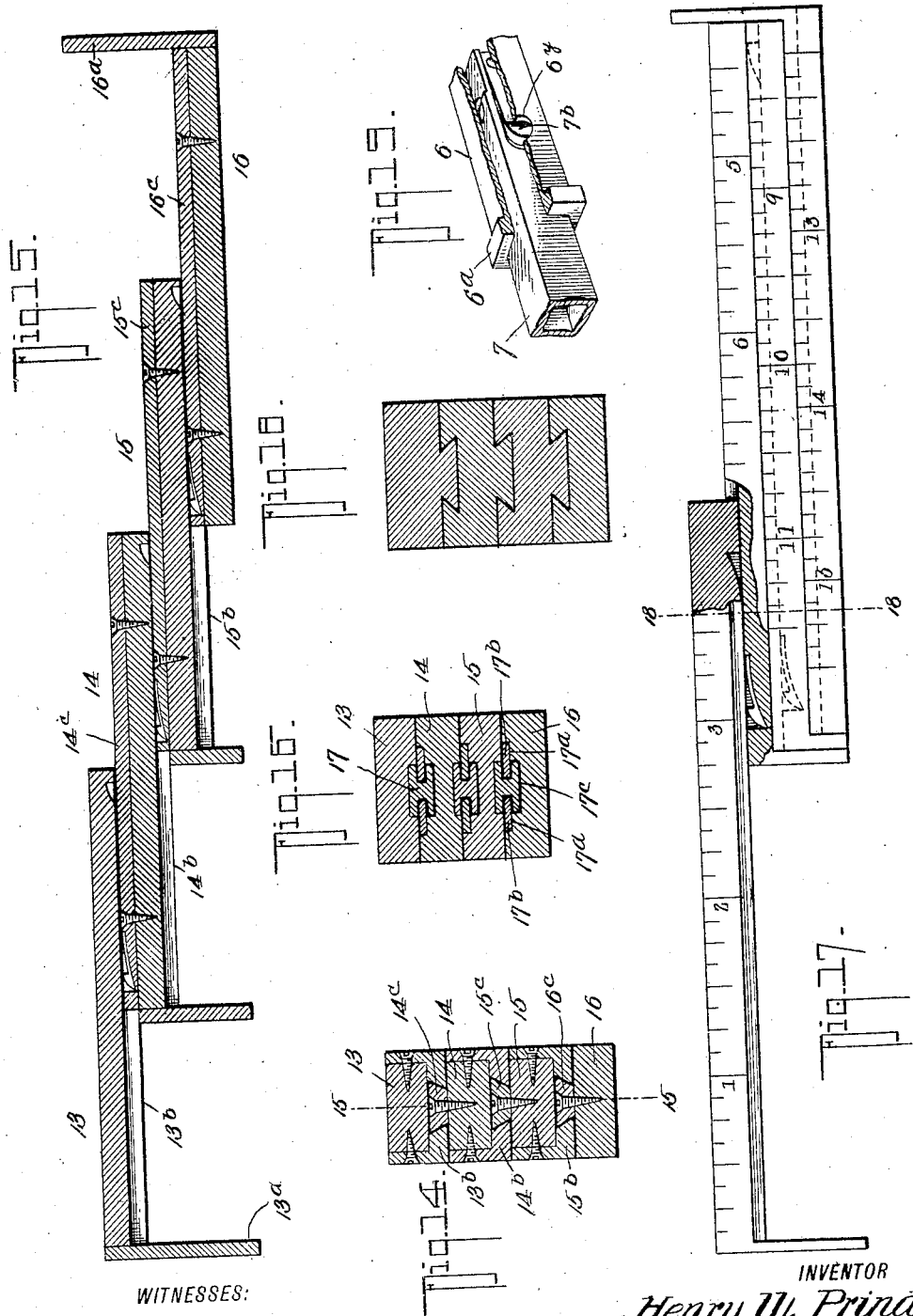
WITNESSES:
O. W. Holmes
John T. Schrott.
INVENTOR
Henry W. Prindle
BY
Fred G. Dieterich & Co.
ATTORNEYS

UNITED STATES PATENT OFFICE.

HENRY URSON PRINDLE, OF SAN FRANCISCO, CALIFORNIA.

EXTENSIBLE RULE AND CALIPERS.

No. 844,536.    Specification of Letters Patent.    Patented Feb. 19, 1907.

Application filed March 27, 1905. Serial No. 252,187.

*To all whom it may concern:*

Be it known that I, HENRY URSON PRINDLE, residing at San Francisco, in the county of San Francisco and State of California, have invented certain new and useful Improvements in Extensible Rules and Calipers, of which the following is a specification.

My invention relates to certain new and useful improvements in extensible rules; and it more particularly relates to the class of measuring instruments in which means are provided for accurately and quickly measuring linear distances.

Generically, my invention comprises a plurality of telescopic or extensible sections having suitable calibrations, which sections are adapted to close up together to form a short instrument which can be readily carried in the pocket.

Again, my invention includes caliper devices carried by and coöperating with the main section of the instrument, which devices can be quickly and easily adjusted to any desired position.

With other objects in view, which will be hereinafter fully apparent, the invention includes certain novel construction, combination, and arrangement of parts, all of which will be first described in detail and then specifically pointed out in the appended claims, reference being had to the accompanying drawings, in which—

Figure 1 is a perspective view of the preferred form of my invention closed up. Fig. 2 is a similar view of the form shown in Fig. 1 opened. Fig. 3 is a side elevation showing the manner of adjusting the closable sections. Fig. 4 is a vertical longitudinal section of the form of my invention shown in Fig. 1. Fig. 5 is a cross-section on the line 5 5 of Fig. 4. Fig. 6 is a detail perspective view of the movable carriage member of the caliper attachment. Fig. 7 is a similar view of the fixed carriage member of the caliper attachment. Fig. 8 is a detail perspective view of the caliper-leg for the movable carriage member. Fig. 9 is a similar view of the caliper-leg for the fixed carriage member. Fig. 10 is a perspective view of a modified form of my invention, showing the same with the sections in their partly-extended position. Fig. 11 is a side elevation thereof, showing the manner of using the same as a caliper. Fig. 12 is a top plan view of the form shown in Fig. 10. Fig. 13 is a perspective view of another form of my invention. Fig. 14 is a cross-section of the form shown in Fig. 13. Fig. 15 is a vertical longitudinal section of the form shown in Fig. 13, taken on the line 15 15 of Fig. 14. Fig. 16 is a cross-section similar to that shown in Fig. 14, but showing a slightly-modified manner of connecting the sections of the form shown in Fig. 13 together. Fig. 17 is a side elevation of a further modification of my invention. Fig. 18 is a cross-section on the line 18 18 of Fig. 17. Fig. 19 is a detail view of the locking means for the sections of the form shown in Fig. 1.

Referring now to the accompanying drawings, in which like numerals and letters of reference indicate like parts in all the figures, 1 designates the main body or section, which is of tubular form throughout and preferably rectangular in cross-section. The section 1 is closed at one end at $1^a$ and has its upper face $1^b$ provided with guides $1^c$ $1^c$ so arranged with respect to one another as to leave a dovetailed groove between them to receive the dovetailed extension $2^a$ of the sliding caliper-carriage 2. The carriage 2 is provided with side portions $2^b$ $2^b$, which ride on the upper face $1^b$ of the body 1, one on each side of the guides $1^c$ $1^c$, as shown in Fig. 1.

$2^c$ designates a dovetailed groove in the upper face of the carriage 2, which groove $2^c$ is arranged across the carriage and at right angles to the body 1. Removably held in the groove $2^c$ by a dovetailed base $4^a$ is a "caliper-leg" 4, which projects beyond the carriage 2 in the longitudinal direction of the section 1 a predetermined distance.

3 designates the fixed caliper-carriage, which is fixedly held at the closed end of the section 1 on its top face $1^b$, and the carriage 3 has a dovetailed bore $3^a$ in alinement with the dovetailed groove $1^g$ between the guides $1^c$ $1^c$ to receive the projected end $2^x$ of the extension $2^a$ of the carriage 2 when the carriage 2 is closed up against the carriage 3. The carriage 3 has a transverse dovetailed groove $3^b$ in its upper face of similar construction to the groove $2^c$ of the carriage 2, and the groove $3^b$ of the carriage 3 is adapted to receive the dovetailed base $5^a$ of the second caliper-leg 5, which is removably mounted on the carriage 3.

The length of the leg 4 is preferably twice that of the leg 5, the combined length of the two being equal to one main division of the scale—namely, one inch.

The body 1 has one of its faces $1^d$ calibrated into suitable divisions and subdivisions—such, for instance, as inches and fractions thereof—beginning with the number "1" and ending with the number "11," the mark "No. 1" being disposed two-thirds (⅔) of an inch from the end of the section 1 for a purpose presently understood. On its opposite face 1ᵉ the section 1 is likewise calibrated, except that the mark zero ("0") begins one-third (⅓) of an inch from the end, as shown in Fig. 7, and in alinement with the inner edge of the fixed carriage.

Telescopically arranged within the section 1 is a second section 6 of like shape in cross-section as the section 1, and the section 6 is formed with a bead 6ᵃ surrounding its free end and has its face 6ᵇ calibrated to correspond with the face 1ᵈ of the section 1. The numbers of division, however, on the section 6 read from right to left, beginning with the number "12" and continuing to the number "20," while the divisions on the face 1ᵈ of the section 1 read "1" to "11" from left to right.

6ᶜ designates a spring-catch carried by the inner end of the section 6 to lock with a notch 1ʸ, Fig. 4, in the wall of the section 1 when the section 6 is fully extended.

Arranged telescopically within the section 6 is a third section 7 of like construction, whose face 7ᵃ is calibrated similarly to the faces 1ᵈ 6ᵇ of the sections 1 and 6, respectively, but whose indicating-numbers read from right to left, beginning at "21" and ending with "30." The section 7 is provided with a spring-catch 7ᵇ, Fig. 19, to interlock with the notch 6ʸ in the section 6 when the section 7 is fully extended. The section 7 has a bead 7ᶜ surrounding its free end, similarly to the bead 6ᵃ of the section 6.

8 designates a fourth section telescopically arranged within the section 7 and of similar construction thereto. The face 8ᵃ of the section 8 is calibrated similarly to the faces 7ᵃ, 6ᵇ, and 1ᵈ of the sections 7 6 1, respectively, the calibrations of the section 8 running from right to left and reading "31" to "39."

So far as described the operation of my invention will be best explained as follows: If it is desired to use my invention as a caliper to measure the inside distance between two points A B, as shown in Fig. 2, the operator adjusts the carriage 2 toward or from the carriage 3, both carriages being held between the points A B. The operator after the adjustment has been made then notes the reading on the scale on face 1ᵈ between the outer (left-hand) edge of the section 1 and the outer (right-hand) edge of leg 4 on carriage 2, which, say, is two and one-quarter inches. This indicates that the distance between the two points A B is two and one-quarter inches. Supposing, however, that the operator desires to find the width of a given piece of material C, (see Fig. 1,) he then places the material between the carriages 2 and 3 and notes the reading between the adjacent edges of the carriages 2 and 3 on the scale on the face 1ᵉ of the section 1, which, say, is "3," thus designating that the width of the object is three inches.

When the sections are folded up, the total length from end to end is eleven inches. Now, supposing that it is desired to have a rule or measure fifteen inches long, the operator then pulls out section 6 until the "15" mark coincides with the "11" mark, as shown in Fig. 3, when the distance between the ends of the device will be fifteen inches. To obtain an instrument, say, twenty inches long, section 6 is pulled out until the "20-inch" mark corresponds with the "11-inch" mark, when the device will be twenty inches long. Should it be desired to obtain a device twenty-eight inches long, section 6 is pulled out to its limit and section 7 pulled out until the "28-inch" mark coincides with the collared edge of the section 6. This makes the instrument twenty-eight inches long. Any intermediate lengths between the full length of the instrument (thirty-nine inches) can be obtained by adjusting the various sections to their wide-open or fully-extended position.

In Figs. 10, 11, and 12 I have shown a slightly-modified form of my invention, in which the instrument is composed of the central or main body portion 10, formed with the grooves 10ᵃ 10ᵃ in its upper and lower edge faces to form, as it were, T portions. At each end and opposite to each other the body portion 10 is provided with bent-over clips 10ᵇ 10ᵇ to embrace the extension members 11 and 12, as shown, and each extension member 11 and 12 has a pair of clips 11ᵃ and 12ᵃ, which bend over the T portion of the main section 10 and into the grooves 10ᵃ 10ᵃ, as shown. At the free end each section 11 and 12 is provided with a right-angled portion 11ᵇ 12ᵇ, which when the parts are folded together forms an end closure or abutment for the instrument. The outer faces 11ˣ, 12ˣ, and 10ˣ of the portions 11, 12, and 10, respectively, are calibrated into suitable divisions—say inches and fractions thereof—the section 11 being provided with four-inch calibrations reading from left to right, while section 10 is provided with calibrations reading from right to left and begin with "5" and end with "8," so that when section 12 is folded up by extending section 11 until the division-mark "6" on the section 10 registers with the edge of the section 11 adjacent the "No. 4" the instrument will be six inches long from end to end. Section 12 is calibrated on its inner face 12ˣ to correspond with the calibrations on the faces 11ˣ and 10ˣ of the sections 10 and 11, respectively, and the calibrations on the section 12 are numbered "9" to "12," reading from right to left, so that when sections 10 and 11 have been extended to their fullest length by pulling out section 12 until the division mark "11" appears the instrument will then be eleven inches in length, and by pulling out section 12 until the mark "12" appears the instrument will be twelve inches in length. The opposite face 11$^y$ of the section 11 is also calibrated in inches and fractions thereof, and the sections 11 and 10 when used together may be made to serve as a caliper, as follows: Supposing it is desired to measure the width of a given piece of material, the said material is placed between the right-angled portion 11$^b$ of the section 11 and the end of the section 10, which sections are then drawn together as far as the material interposed will permit. The instrument is then removed from the material and the scale reading on the face 11$^y$ is taken, which will give the width of the material in inches and fractions thereof.

In Fig. 13 I have shown another modification of my invention, by reference to which it will be seen that the instrument is composed of a plurality of sections 13, 14, 15, and 16, the sections 13 and 16 of which have right-angled portions 13$^a$ and 16$^a$, similar to those of the form shown in Fig. 10. Each section 13, 14, 15, and 16 comprises a body portion rectangular in cross-section and preferably constructed of wood. To this body portion are secured a pair of metal guides 13$^b$, 14$^b$ 15$^b$ 16$^b$, respectively, forming between them a dovetailed groove to receive the dovetailed portion 14$^c$, 15$^c$, and 16$^c$, respectively, of the connecting-sections, and these dovetailed portions are also preferably constructed of metal. The section 13 is calibrated on its face to read from one to six divisions from left to right, the section 14 is calibrated to read from seven to twelve divisions from right to left, the section 15 is calibrated to read from thirteen to eighteen divisions from right to left, while the section 16 is calibrated to read from nineteen to twenty-four inches from right to left, the various adjustments of the instrument being made to attain the different lengths in a manner similar to that used for the other forms of my invention hereinbefore described.

Fig. 16 discloses a cross-section showing a slightly-modified manner of attaching the sections 13, 14, 15, and 16 together, and in this form the top slide portion is provided with an eye-shaped member 17 on its under surface, while the bottom slide is provided with a groove 17$^a$, in which a pair of parallel plates 17$^b$ is secured to form a T-slot 17$^c$ to receive the eye member of the top slide, the intermediate slide being formed both with the groove and parallel plates and with the eye member, as shown, to properly coöperate with the top and bottom slides.

From the foregoing description, taken in connection with the accompanying drawings, it is thought the complete construction, operation, and many advantages of my invention will be readily apparent to those skilled in the art to which it appertains, and it is thought that from the foregoing description, taken in connection with the drawings, it will be readily seen that I have provided a very simple and effective instrument for measuring linear distances and which may be used either as an ordinary rule-measure or as a caliper, as occasion may require.

Having thus described my invention, what I claim, and desire to secure by Letters Patent, is—

1. An instrument of the character stated, comprising outer and inner flat sections endwise extensible and slidable on each other, the outer sections having right-angled portions at their free ends and interlocking ears at their other ends for interlocking with the intermediate section, said intermediate section having ears for engaging the outer sections, all of said sections having corresponding faces graduated and one of said outer sections having its opposite face graduated substantially as shown and described.

2. A rule comprising a central body portion having grooves in its upper and lower edge faces, bent-over clips at each end of said central portion on opposite sides thereof, a pair of sheet-metal extension members slidable against said central member through the clips thereof and provided at the central-member-engaging end with bent-over clips to enter the grooves of the central member and provided at their other ends with right-angled portions, substantially as shown and described.

3. A rule comprising a central body portion having grooves in its upper and lower edge faces, bent-over clips at each end of said central portion on opposite sides thereof, a pair of sheet-metal extension members slidable against said central member through the clips thereof and provided at the central-member-engaging end with bent-over clips to enter the grooves of the central member and provided at their other ends with right-angled portions, all of said members being provided with graduations, the calibrations of one extension member being four in number and reading from left to right to indicate inches, the calibrations of the central member being in inches reading from right to left to indicate five to eight, the other extension member having its calibrations divided into inches reading from nine to twelve, from right to left, substantially as shown and described.

HENRY URSON PRINDLE.

Witnesses:
A. J. MORSMAYER.
RAY BARTHURST.